US008553239B2

United States Patent
Ohk

(10) Patent No.: US 8,553,239 B2
(45) Date of Patent: Oct. 8, 2013

(54) IMAGE FORMING APPARATUS TO CORRECT MISALIGNED SCANNED DOCUMENT AND METHOD OF CONTROLLING THE SAME

(75) Inventor: Hyung Soo Ohk, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1106 days.

(21) Appl. No.: 12/103,897

(22) Filed: Apr. 16, 2008

(65) Prior Publication Data

US 2009/0015887 A1    Jan. 15, 2009

(30) Foreign Application Priority Data

Jul. 13, 2007  (KR) .................. 10-2007-0070520

(51) Int. Cl.
*G06K 15/02* (2006.01)
(52) U.S. Cl.
USPC ......... 358/1.11; 358/1.12; 358/488; 382/176; 382/289
(58) Field of Classification Search
USPC .................. 382/176, 177, 289; 358/474, 488; 715/809; 412/11
See application file for complete search history.

(56) References Cited

U.S. PATENT DOCUMENTS

| 5,111,514 A * | 5/1992 | Ohta ............................ 382/177 |
| 5,383,754 A * | 1/1995 | Sumida et al. ................. 412/11 |
| 5,508,810 A * | 4/1996 | Sato ............................. 358/488 |
| 5,781,660 A * | 7/1998 | Nitta et al. .................... 382/177 |
| 6,084,988 A * | 7/2000 | Kanno et al. ................. 382/289 |
| 6,263,118 B1 * | 7/2001 | Kanno et al. ................. 382/289 |
| 6,295,385 B1 * | 9/2001 | Takaoka et al. .............. 382/289 |
| 6,791,723 B1 * | 9/2004 | Vallmajo et al. ............. 358/488 |
| 7,239,747 B2 * | 7/2007 | Bresler et al. ................ 382/176 |
| 2005/0183033 A1 * | 8/2005 | Feinberg et al. ............. 715/809 |
| 2006/0033967 A1 * | 2/2006 | Brunner ....................... 358/474 |

FOREIGN PATENT DOCUMENTS

JP       2001-326810     11/2001

* cited by examiner

*Primary Examiner* — Twyler Haskins
*Assistant Examiner* — Nicholas Pachol
(74) *Attorney, Agent, or Firm* — Stanzione & Kim, LLP

(57) ABSTRACT

A sheet of a document is scanned, character objects are extracted from a scan image, the extracted character objects are divided line by line, and the direction of the document is set on the basis of a blank percentage determined according to start and end positions of lines. If the direction of the document is different from that of a previous document, an image processing unit rotates the scan image.

14 Claims, 9 Drawing Sheets

IMAGE FORMING APPARATUS TO CORRECT MISALIGNED SCANNED DOCUMENT AND METHOD OF CONTROLLING THE SAME

CROSS-REFERENCE TO RELATED APPLICATIONS

This application claims the benefit of Korean Patent Application No. 2007-70520, filed on Jul. 13, 2007 in the Korean Intellectual Property Office, the disclosure of which is incorporated herein by reference in its entirety.

BACKGROUND OF THE INVENTION

1. Field of the Invention

The present general inventive concept relates to an image forming apparatus capable of aligning documents in a predetermined direction and a method of controlling the same.

2. Description of the Related Art

Generally, an image forming apparatus scans an image recorded on a document and transmits the scanned image to a printer to print the scanned image or transmits the scanned image to a host computer to store the scanned image.

Recently, a scanning function of an image forming apparatus which is being developed can continuously scan a large amount of documents.

In a process of loading a large amount of documents on a document load table, documents which are not aligned in a predetermined direction may be mixed in different directions. When a large amount of documents is continuously scanned, scan images are aligned in the same direction as the documents are loaded. That is, since the directions of the scan images may be different from each other, a user should align the documents in a predetermined direction after a printing operation is completed and prior to scanning. Accordingly, in order to perform a subsequent operation such as an operation to print or store the scan image, the documents need to be aligned prior to scanning.

In order to align a large amount of documents in a predetermined direction, an operation to individually check the direction of the documents and aligning documents which are not aligned in the predetermined direction is required. Such an operation is troublesome and time-consuming.

Accordingly, there is a need for a method of analyzing scan images obtained by scanning documents and aligning the documents in the predetermined direction.

SUMMARY OF THE INVENTION

The present general inventive concept provides an image forming apparatus and a method of controlling the same, which are capable of conveniently performing an operation to align documents in a predetermined direction by determining the direction of documents using blank information of scan images.

Additional aspects and/or advantages of the general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including a scanning unit to scan a document and to outputs a scan image, a document direction determining unit to determine the direction of the document using a blank region included in a character region of the scan image, and an image processing unit to receive the scan image output from the scanning unit and to receive information on the direction of the document from the document direction determining unit and to rotate the received scan image output from the scanning unit such that the direction of the scan image is equal to a direction of a previous document.

The image forming apparatus may further include a scan buffer to temporarily store the scan image output from the scanning unit, and the scan buffer supplies the scan image to the document direction determining unit and the image processing unit.

The document direction determining unit may extract character objects from the scan image, divide the extracted character objects line by line, and check a blank percentage of each line according to a start position and an end position of each line.

The document direction determining unit may store information on the direction of the scan image whenever a sheet of a document is scanned, compare the direction of the scan image with a direction of the previous document on the basis of the stored information on the direction of the scan image, and supply the compared result to the image processing unit.

The foregoing and/or other aspects and utilities of the present general inventive concept may also be achieved by providing a method of controlling an image forming apparatus, the method including scanning a document and outputting a scan image, setting a direction of the document according to a blank region included in a character region of the scan image, determining whether the set direction of the document is equal to a direction of a previous document, and rotating the scan image such that the direction of the document is equal to the direction of the previous document if it is determined that the direction of the document is different from the direction of the previous document.

The setting of the direction of the document may include extracting character objects from the scan image, extracting representative points of the extracted character objects, dividing the character objects line by line according to a height of the representative points of the character objects, and checking a blank percentage of each line according to a start position and an end position of each line.

The direction of the document may be set and information on the set direction of the document may be stored, whenever a sheet of a document is scanned.

The rotating of the scan image may include rotating the scan image by 180 degrees in order to reverse a position of a head portion and a tail portion of the document.

The method may further include performing an image enhancement process with respect to the scan image and transmitting the enhanced scan image to a printer or a computer after rotating the scan image.

The foregoing and/or other aspects and utilities of the present general inventive concept may also be achieved by providing a scan image direction correction system, including a scanning unit to scan a printed document and to output a scan image of the printed document, and a document direction correction unit to receive the scan image, to detect an orientation of the scan image, to compare the detected orientation of the scan image to an orientation of a previously scanned document, and to rotate the scan image based on the comparison of the orientation of the scan image and the previously scanned document.

The document direction correction unit may detect the orientation of a scan image by determining at least one object group corresponding to objects of the scan image on a line by line basis including determining a blank percentage associated with the at least one object group.

The document direction correction unit may rotate the scan image based on the determined blank percentage of the scan image.

The foregoing and/or other aspects and utilities of the present general inventive concept may also be achieved by providing method to correct misaligned scanned document images, including scanning a sheet of a multi-sheet printed document to provide a scan image of the sheet, determining an orientation of the scan image and whether the scan image has an orientation equal to that of a previously scanned sheet of the multi-sheet document, and rotating the scan image to equate the determined orientation of the scan image to that of the previously scanned sheet of the multi-sheet document.

Rotating the scan image may be accomplished based on information corresponding to a determined blank percentage corresponding to objects contained within the scan image.

BRIEF DESCRIPTION OF THE DRAWINGS

These and/or other aspects and utilities of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
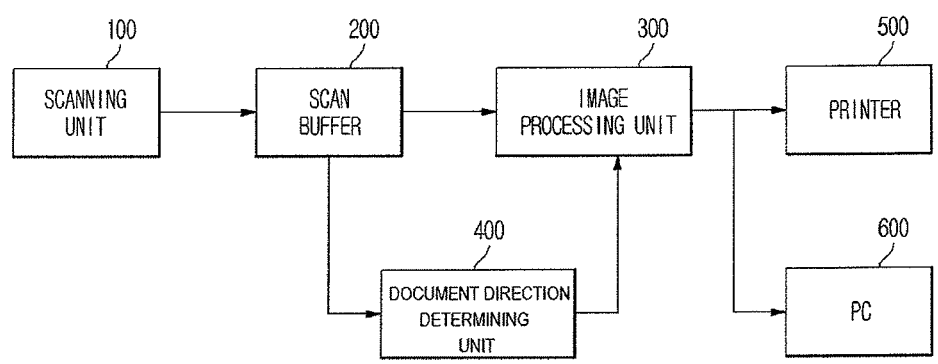
FIG. 1 is a block diagram of an image forming apparatus according to the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Hereinafter, an image forming apparatus and a method of controlling the same according to an embodiment of the present general inventive concept will be described.

As illustrated in FIG. 1, the image forming apparatus according to the present general inventive concept includes a scanning unit 100, a scan buffer 200, an image processing unit 300, a document direction determining unit 400, a printer 500 and a computer 600 which may be a PC.

The scanning unit 100 scans a document and acquires a scan image. The scanning unit 100 scans an image recorded on a document using an image sensor mounted on a document transfer path of an image forming apparatus (not illustrated). The image sensor may be, for example, a charge coupled device (CCD) or a contact image sensor (CIS).

The scan buffer 200 temporarily stores the scan image of the document provided by the scanning unit 100 and supplies the scan image to the image processing unit 300 and the document direction determining unit 400.

The image processing unit 300 performs an image enhancement process to make characters of the scan image clear or performs processing of a background image such that the scan image is suitably ready for a subsequent operation such as a printing operation or a storing operation of the enhanced scan image. The scan image enhanced by the image processing unit 300 is transmitted to the printer 500 or to the computer 600 via a wired/wireless connection unit (not illustrated).

The document direction determining unit 400 supplies information on the document direction of the scan image received from the scan buffer 200 to the image processing unit 300. With respect to a scan image of which the document direction needs to be changed to that of a predetermined direction, the image processing unit 300 rotates the scan image received from the scan buffer 200 to the predetermined direction on the basis of the information on the document direction received from the document direction determining unit 400 and performs the image enhancement process.

In a present embodiment, the document direction determined by the document direction determining unit 400 is divided into two situations. The document direction determining unit 400 determines whether a document has been scanned in a state in which the document is aligned in a predetermined direction, or whether the scanned document has been rotated by 180 degrees, that is, the head portion and the tail portion of the document are reversed from that of a predetermined direction.

Figure 2A:
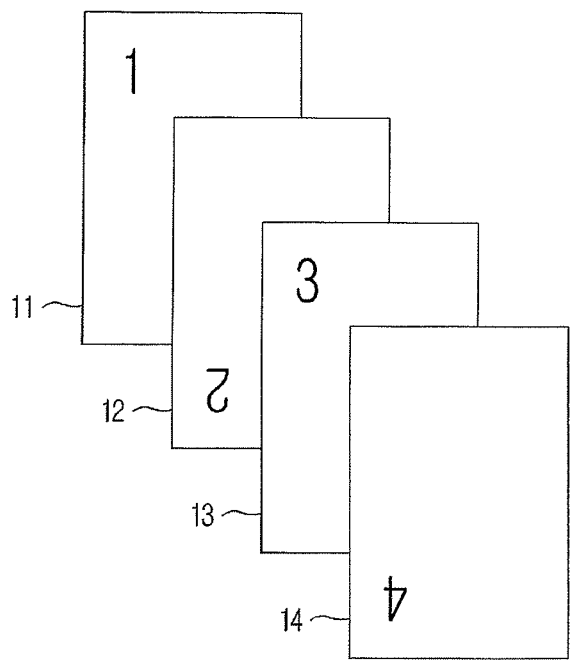
FIG. 2A is a view illustrating an embodiment where correctly arranged documents, and incorrectly arranged documents each of which has a head portion and a tail portion being reversed, are mixed together.
Figure 2B:
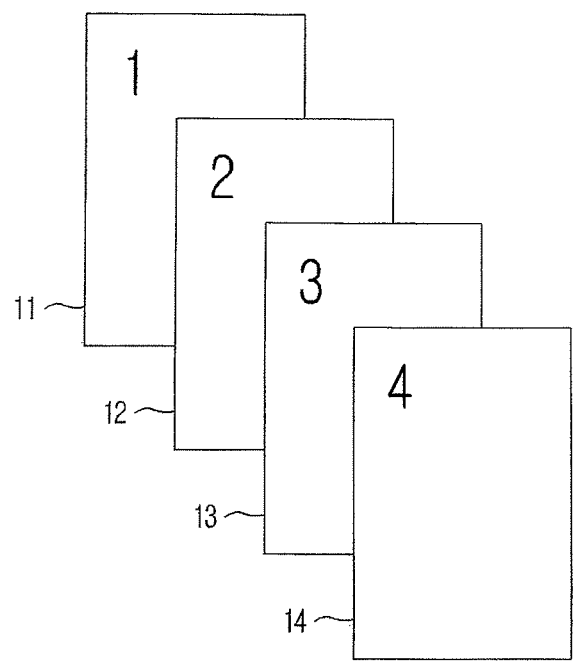
FIG. 2B is a view illustrating an embodiment where documents are correctly arranged in a predetermined direction.

As illustrated in FIG. 2A, it is assumed that the first and third documents 11 and 13 are aligned in a predetermined direction and the second and fourth documents 12 and 14 are aligned in an opposite direction from that of the predetermined direction. Even though scan images obtained by scanning the documents aligned as illustrated in FIG. 2A may be supplied to the image processing unit 300, the document direction determining unit 400 supplies information on the document direction of the scan images to the image processing unit 300 such that the image processing unit 300 aligns the scan images in a same direction, as illustrated in FIG. 2B.

The document direction determining unit 400 determines the document direction using blank information from the scan image.

Figure 3A:
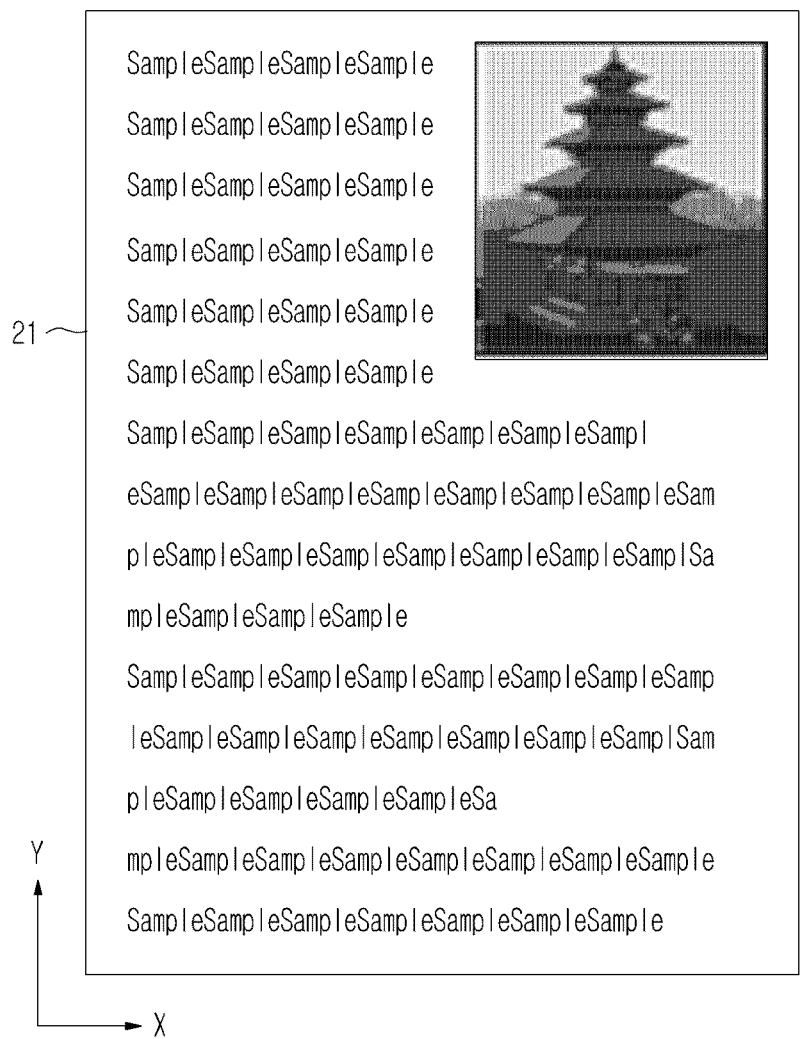
FIG. 3A is a view illustrating a document including a character region and a picture region.

A sample document 21 illustrated in FIG. 3A includes characters and a photograph or picture. The sample document 21 is laid at a normal position (X, Y) of a document load table of a document scanning device (not illustrated) of an image forming apparatus.

The scanning unit 100 scans the sample document 21 and supplies a scan image of the sample document to the scan buffer 200 as a binarized scan image.

Figure 3B:
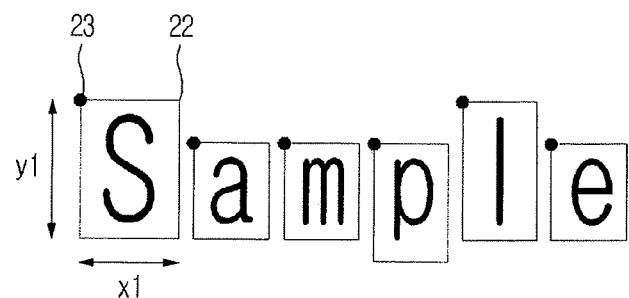
FIG. 3B is a view illustrating an operation to extract objects from a scan image according to the present general inventive concept.

The document direction determining unit 400 receives the scan image of the sample document from the scan buffer 200 and extracts objects from the scan image. The document direction determining unit 400 extracts the objects, which are regions of the scan image surrounded by "0", from the binarized scan image. The extracted objects may, for example, include character objects and picture objects. For example, as illustrated in FIG. 3B, a leading object 22 of a plurality of extracted character objects has a width of x1 (from 23 to 22) and a height of y1 (from 25 to 23).

The document direction determining unit 400 extracts representative points of the objects and binds the objects according to the height of the representative points, line by line, after extracting the objects. Accordingly, as illustrated in FIG. 3C, a scan image 31 is divided into a character region 32 which includes character objects and a picture region 33 which includes picture objects.

Figure 3C:
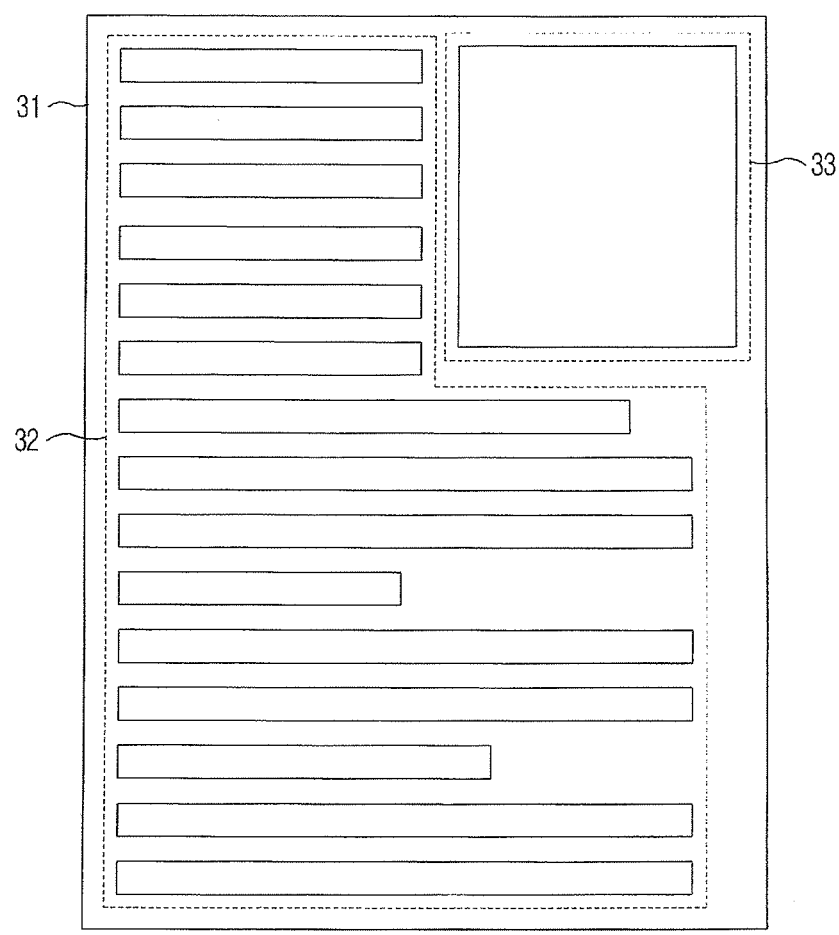
FIG. 3C is a view illustrating a scan image which is divided into a character region including character objects and a picture region including picture objects as a result of extracting the objects according to the present general inventive concept.
Figure 3D:
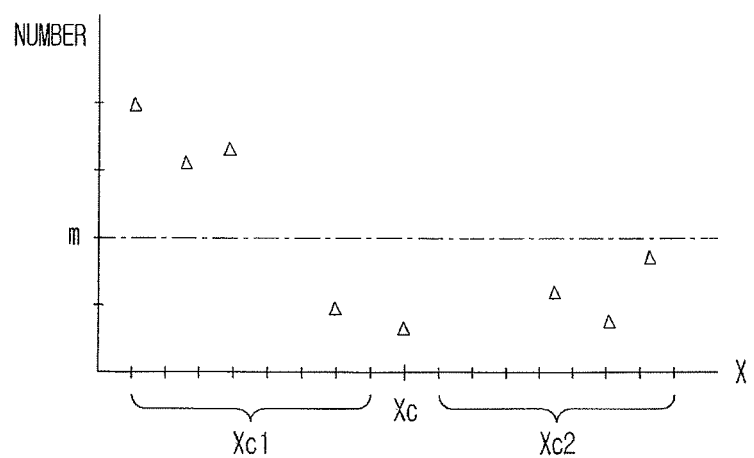
FIG. 3D is a view illustrating a distribution of representative points of character objects at a horizontal position of a document according to the present general inventive concept.

The representative points of the character objects of the character region 32 on one sheet of a document are irregularly distributed with respect to a horizontal position, as illustrated in FIG. 3D. That is, for the representative points located at the left side Xc1 of a central position Xc of the document, the number of representative points positioned at the same horizontal position is greater than a reference number m and, for the representative points located at the right side Xc2 of the central position Xc of the document, the number of representative points positioned at the same horizontal position is less than the reference number m.

Figure 3E:
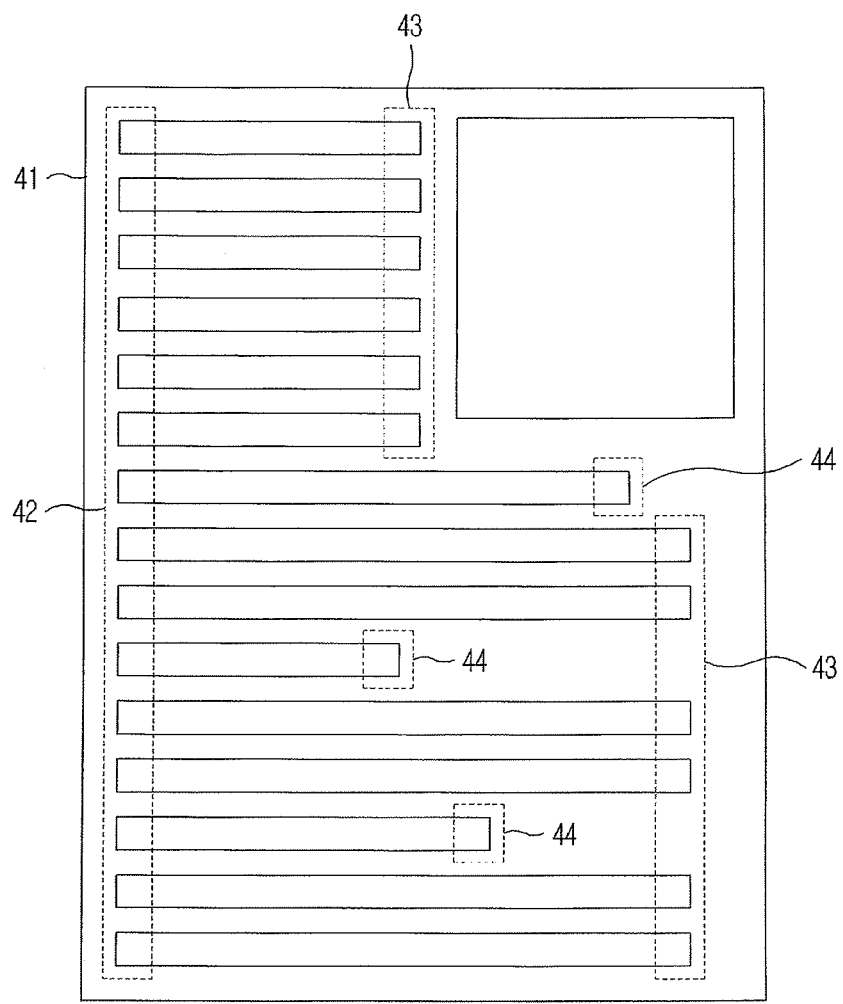
FIG. 3E is a view illustrating blank portions of lines of a document, that is, a case where a blank portion percentage is high at a right side of a central position of a document according to the present general inventive concept.

Referring to FIGS. 3C and 3E, the start positions of sentences in a document are substantially equal to one another, but the end positions of the sentences may differ from one another. Accordingly, blank portions of the sentences can be checked by checking the positions of the representative points of the character objects. If objects are divided into groups according to the position of representative points of the character objects, a scan document 41, as illustrated in FIG. 3E, includes a first group 42 in which the horizontal positions of the representative points of the character objects corresponding to start positions of lines are equal to one another, a second group 43 in which the horizontal positions of the representative points of the character objects corresponding to end positions of the lines are not equal to one another but a blank does not exist where a character can be substantially recorded, and a third group 44 in which the horizontal positions of the representative points of the character objects corresponding to the end positions of the lines are not equal to one another and a blank exists where a character can be substantially recorded.

If the character object belonging to the third group 44 is present, a blank percentage is high. Accordingly, the document direction determining unit 400 can determine the document direction on the basis of the blank percentage. If a sheet of a multi-sheet document is scanned, the document direction determining unit 400 stores information on the document direction of the scanned sheet together with a document number of the multi-sheet scan document.

If documents are continuously scanned, the document direction determining unit 400 compares the direction of a current document with a direction of a previous document, determines whether the direction of the previous document and the current document are equal to each other, and supplies information on the document direction according to the determined result to the image processing unit 300 so to the image processing unit 300 can properly perform a process on the scan document corresponding to the supplied information.

Figure 4:
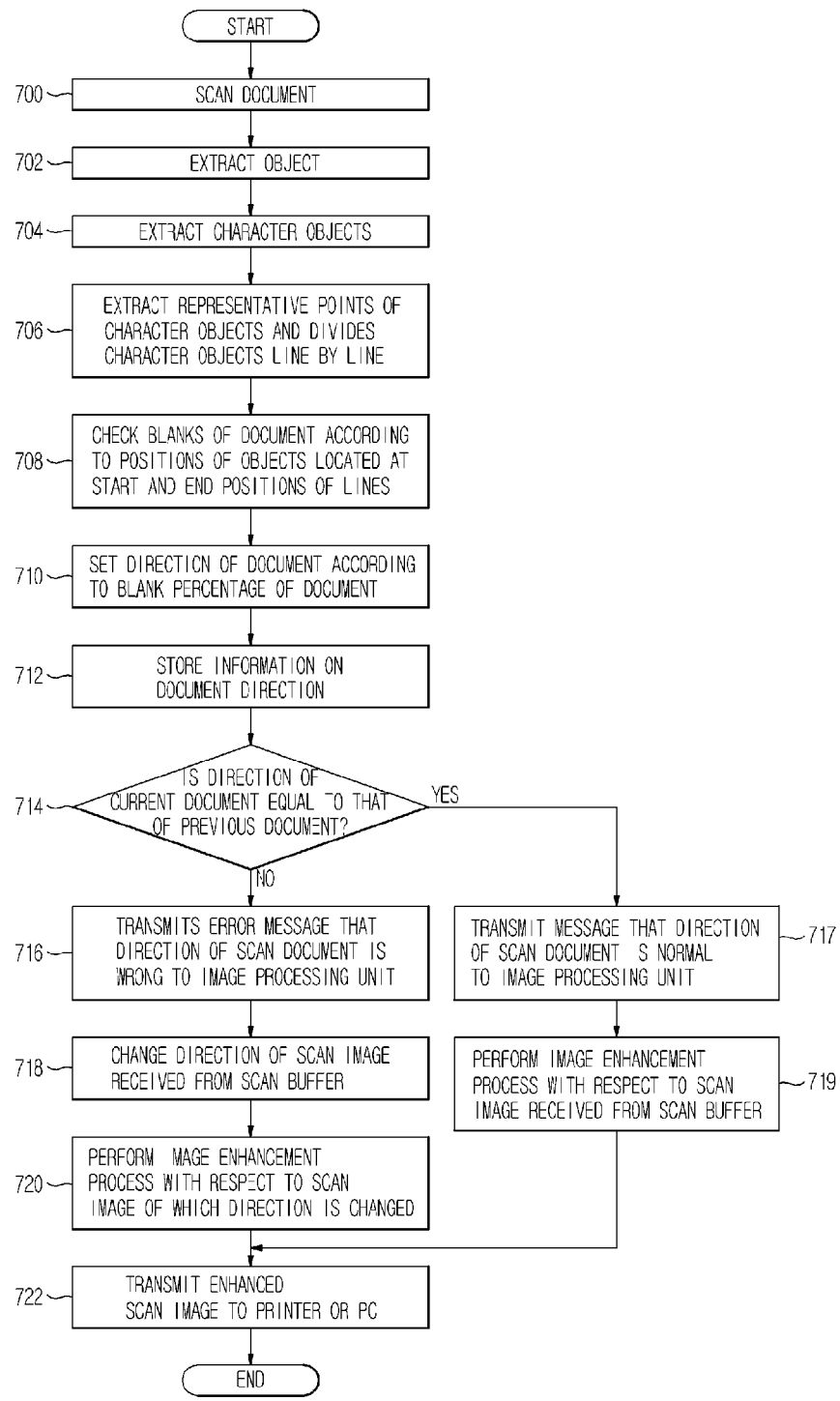
FIG. 4 is a flowchart illustrating a method of controlling an image forming apparatus according to the present general inventive concept.

Hereinafter, a method of controlling the image forming apparatus according to the present general inventive concept will be described with reference to FIG. 4.

A method of controlling an apparatus which automatically transfers and scans a single sheet or multi-sheet document when the document is loaded on the document load table will be described below.

When a sheet of a document is transferred to the scanning unit 100 of a document scanning device (not illustrated), the scanning unit 100 scans the document using an image sensor (not illustrated) and supplies a scan image to the scan buffer 200 (operation 700).

The scan buffer 200 temporarily stores the scan image and supplies the scan image to the image processing unit 300 and the document direction determining unit 400.

The document direction determining unit 400 extracts character objects and picture objects included in the scan image received from the scan buffer 200 (operation 702).

The document direction determining unit 400 extracts character objects only on the basis of the widths and the heights of the objects, excluding objects other than character objects. For example, the scan document 31 illustrated in FIG. 3C is divided into a character region 32 including character objects and a picture region 33 including picture objects (operation 704).

Next, the document direction determining unit 400 extracts representative points of the character objects and divides the character objects line by line such that the representative points of the extracted objects, of which the object heights are within a predetermined range, are determined to be on a single line (operation 706).

Next, the document direction determining unit 400 divides the objects into first through third groups according to horizontal positions of objects located at the start and end positions of lines, for example as illustrated in FIG. 3E, and checks blanks of the document to determine whether a third group 44 of object is present (operation 708).

Subsequently, the document direction determining unit 400 sets a direction of the document according to a blank percentage of the document, that is, it sets a direction of the document depending on whether the left side Xc1 or the right side Xc2 of the central position Xc of the document has a large amount of third groups 44 of distributed objects (operation 710).

Next, the document direction determining unit 400 stores information on the document direction, compares the direction of the current document with the direction of a previous document, and determines whether the direction of the current document is equal to that of the previous document (operation 714).

If it is determined that the direction of the current document is not equal to that of the previous document, the document direction determining unit 400 transmits an error message to the image process unit 300 to indicate that the direction of the scan document is incorrect with respect to a predetermined direction (operation 716) and the image processing unit 300 then changes the direction of the current document received from the scan buffer 200, that is, it rotates the head portion and the tail portion of the document by 180 degrees (operation 718) so it is properly orientated with respect to the predetermined direction for the document.

Next, the image processing unit 300 performs an image enhancement process with respect to the scan image of which the direction has been changed (operation 720). Thereafter, the enhanced scan image is transmitted to the printer 500 or to the computer 600 which may be a PC (operation 722).

If it is determined that the direction of the current document is equal to that of the previous document, the document direction determining unit 400 supplies a message to the image processing unit 300 that the direction of the scan document is normal, that is, the direction of the current document is equal to that of the previous document (operation 717). Then, the image processing unit 300 performs an image enhancement process of enhancing the scan image of the current document received from the scan buffer 200 (operation 719) and transmits the enhanced scan image to the printer 500 or to the computer 600 (operation 722).

As described above, according to the present general inventive concept, objects are extracted from a scan image, a blank percentage of a character region is checked according to coordinate positions of the objects, and a direction of the document is determined on the basis of blank percentage information. Accordingly, it is possible to match directions of the documents which are continuously scanned with one another. Thus, it is possible to align documents in a predetermined direction at a time of processing the scan image, without encountering problems of having documents, or sheets or documents, arranged in an incorrect position, and to improve ease of use.

Although a few embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. An image forming apparatus comprising:
   a scanning unit to scan a document and to output a scan image;
   a document direction determining unit to determine a direction of the document using a blank region included in a character region of the scan image, the blank region being defined at least by an end position of a line; and
   an image processing unit to receive the scan image output from the scanning unit and to receive information on the direction of the document from the document direction determining unit and to rotate the received scan image output from the scanning unit such that a direction of the scan image is equal to a direction of a previous document.

2. The image forming apparatus according to claim 1, further comprising:
   a scan buffer to temporarily store the scan image output from the scanning unit,
   wherein the scan buffer supplies the scan image to the document direction determining unit and to the image processing unit.

3. The image forming apparatus according to claim 1, wherein the document direction determining unit extracts character objects from the scan image, divides the extracted character objects line by line, and checks a blank percentage of each line according to a start position and an end position of each line.

4. The image forming apparatus according to claim 1, wherein the document direction determining unit stores information on the direction of the scan image whenever a sheet of a document is scanned, compares the direction of the scan image with a direction of the previous document on the basis of the stored information on the direction of the scan image, and supplies the compared result to the image processing unit.

5. A method of controlling an image forming apparatus, the method comprising:
   scanning a document and outputting a scan image;
   setting a direction of the document according to a blank region included in a character region of the scan image, the blank region being defined at least by an end position of a line;
   determining whether the set direction of the document is equal to a direction of a previous document; and
   rotating the scan image such that the direction of the document is equal to the direction of the previous document if it is determined that the direction of the document is different from the direction of the previous document.

6. The method according to claim 5, wherein the setting of the direction of the document includes:
   extracting character objects from the scan image;
   extracting representative points of the extracted character objects;
   dividing the character objects line by line according to a height of the representative points of the character objects; and
   checking a blank percentage of each line according to a start position and an end position of each line.

7. The method according to claim 5, wherein the direction of the document is set and information on the set direction of the document is stored whenever a sheet of a document is scanned.

8. The method according to claim 5, wherein the rotating of the scan image includes rotating the scan image by 180 degrees in order to reverse a position of a head portion and a tail portion of the document.

9. The method according to claim 8, further comprising:
   performing an image enhancement process with respect to the scan image and transmitting the enhanced scan image to a printer or a computer after rotating the scan image.

10. A scan image direction correction system, comprising:
    a scanning unit to scan a printed document and to output a scan image of the printed document; and
    a document direction correction unit to receive the scan image, to detect an orientation of the scan image using a blank region included in a character region of the scan image, the blank region being defined at least by an end position of a line, to compare the detected orientation of the scan image to an orientation of a previously scanned document, and to rotate the scan image based on the comparison of the orientations of the scan image and the previously scanned document.

11. The scan image direction correction system of claim 10, wherein the document direction correction unit detects the orientation of a scan image by determining at least one object group corresponding to objects of the scan image on a line by line basis including determining a blank percentage associated with the at least one object group.

12. The scan image direction correction system of claim 11, wherein document direction correction unit rotates the scan image based on the determined blank percentage of the scan image.

13. A method to correct misaligned scanned document images, comprising:
    scanning a sheet of a multi-sheet printed document to provide a scan image of the sheet;
    determining an orientation of the scan image using a blank region included in a character region of the scan image, the blank region being defined at least by an end position of a line, and whether the scan image has an orientation equal to that of a previously scanned sheet of the multi-sheet document; and
    rotating the scan image to equate the determined orientation of the scan image to that of the previously scanned sheet of the multi-sheet document.

14. The method to correct misaligned scanned document images of claim 13, wherein rotating the scan image is accomplished based on information corresponding to a determined blank percentage corresponding to objects contained within the scan image.

\* \* \* \* \*